United States Patent [19]

Berson

[11] Patent Number: 5,598,477
[45] Date of Patent: Jan. 28, 1997

[54] APPARATUS AND METHOD FOR ISSUING AND VALIDATING TICKETS

[75] Inventor: William Berson, Weston, Conn.

[73] Assignee: Pitney Bowes Inc., Stamford, Conn.

[21] Appl. No.: 343,392

[22] Filed: Nov. 22, 1994

[51] Int. Cl.$^6$ .................................................. H04L 9/00
[52] U.S. Cl. .......................................................... 380/51
[58] Field of Search .............................. 380/51; 235/373, 235/380

[56] References Cited

U.S. PATENT DOCUMENTS

| | | | |
|---|---|---|---|
| 3,985,998 | 10/1976 | Crafton | 235/380 |
| 5,119,295 | 6/1992 | Kapur | 380/51 |
| 5,270,921 | 12/1993 | Hornick | 364/407 |
| 5,317,135 | 5/1994 | Finocchio | 235/375 |
| 5,398,932 | 3/1995 | Eberhardt et al. | 380/51 |

*Primary Examiner*—Salvatore Cangialosi
*Attorney, Agent, or Firm*—Robert H. Whisker; Melvin J. Scolnick

[57] ABSTRACT

A system and method for issuing and validating tickets. The system includes a data processing system for receiving ticket request information and generating ticket information; the ticket information including encrypted validating information, a local printing system which receives the ticket information and prints the encrypted validating information on a ticket in machine readable format, and a validating system for converting the encrypted validating information into a digital format, decrypting the validating information, testing the validating information to validate the ticket and, if the ticket is valid, downloading at least a portion of the ticket information for reconciliation of accounts; that is for reconciling ticket issuance, use, and payment. The data processing system receives an itinerary from a purchaser, checks a reservation system to determine service availability and provides service availability information to the purchaser who selects appropriate services and submits ticket request information. The data processing system then generates ticket information including encrypted validating information and transmits the ticket information to the local printing system which prints a ticket having the encrypted validating information printed in a machine readable format. When the ticket is presented to a validating system the validating system converts the encrypted validating information into a digital format, decrypts the encrypted validating information, tests the validating information to validate the ticket and, if the ticket is valid, downloads at least a portion of the ticket information for reconciliation of accounts, that is for reconciliation of ticket issuance, use and payment. A number of encryption protocols for encryption of the validating information are also disclosed.

21 Claims, 3 Drawing Sheets

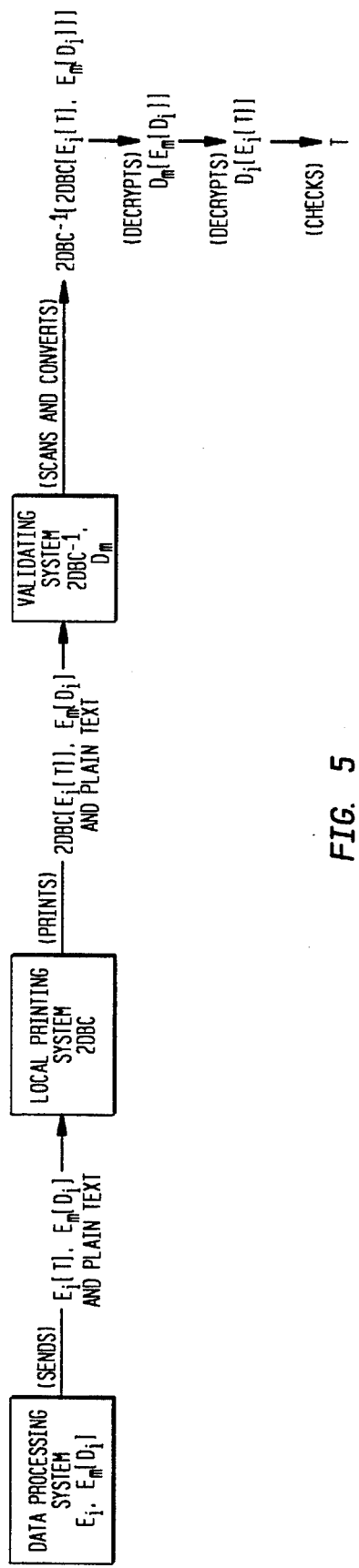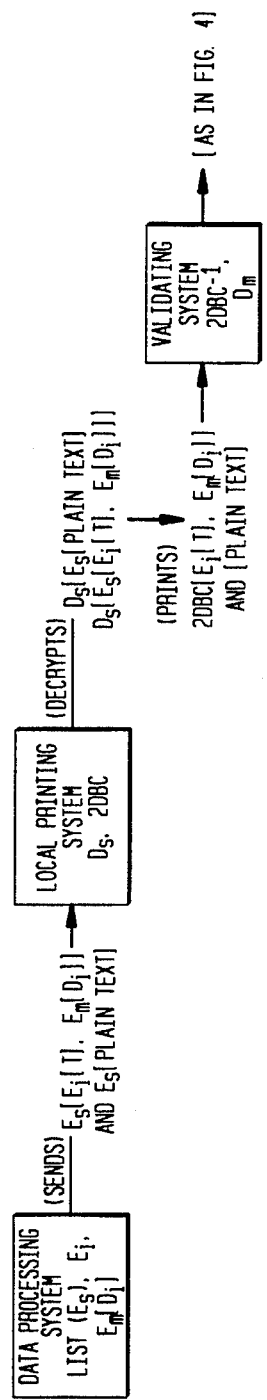

APPARATUS AND METHOD FOR ISSUING AND VALIDATING TICKETS

BACKGROUND OF THE INVENTION

The subject invention relates to an apparatus and method for automatically issuing tickets at remote locations and automatically validating such tickets when presented. More particularly, it relates to an apparatus and method for issuing and validating airline tickets.

Tickets such as airline and sports tickets are documents having a substantial intrinsic value which typically may be presented by any bearer to gain admittance or exercise an entitlement. Since such tickets may have substantial cash value there exists a continuing problem of validating such tickets. The problem of validation is further complicated, particularly for airline tickets, by the market need to issue such tickets at large numbers difference locations and at various times.

Presently, issuance of tickets, such as airline tickets, is controlled by means of controlled supplies (e.g. serialized ticket stock) and by allowing tickets to be issued only by controlled, authorized issuers (e.g. travel agents). Controlled supplies are expensive, difficult to control, and prone to theft or counterfeiting. Authorized and controlled issuers are an expensive complication of the process of issuing and validating tickets where, in the case of airline tickets, travel agents collect a 10% commission of the retail ticket price for issuing tickets on behalf of the airlines. Perhaps more importantly, because of the various ways in which a ticket may be issued reconciliation of tickets (i.e. matching of the issuance, use, and payment for a ticket) is generally a manual, labor intensive job.

U.S. Pat. No. 4,853,961; to: J. Pastor; for: RELIABLE DOCUMENT AUTHENTICATION SYSTEM; issued: Aug. 1, 1989, which is hereby incorporated by reference, discloses one scheme for the authentication of valuable documents. In this patent a document is authenticated by imprinting on the document information encrypted with an encryption key for a public key encryption system, such as the well known RSA system. A corresponding decryption key is encrypted with a second encryption key and also printed on the document. A verifying or validating station stores a decryption key corresponding to the second encryption key, decrypts the encrypted decryption key, uses the decryption key so recovered to decrypt the encrypted information on the document, and tests the recovered information to validate the document. In this system the verifying station need only store a single decryption key while a number of authenticating stations may issue documents in a manner such that compromise of one issuing station will not compromise the entire system.

While believed satisfactory for the general problem of authenticating and validating documents the system closed in the Pastor patent is not specifically adapted to the problem of issuing and validating tickets; and is particularly not adapted to solve the problem of reconciling ticket usage.

Thus it is an object of the subject invention to provide an apparatus and method for securely issuing tickets, such as airline tickets, at remote locations and for automatically validating such tickets when presented.

BRIEF SUMMARY OF THE INVENTION

The above object is achieved, and the disadvantages of the prior art are overcome, in accordance with the subject invention by means of a system and method for issuing tickets at remote locations and validating such tickets which includes a data processing system, a local printing system, and a validating system. The data processing system receives ticket request information from a ticket purchaser and generates ticket information which includes encrypted validating information. The local printing system receives the ticket information and prints the encrypted validating information on a ticket in a machine readable format, preferably along with conventional ticket information in a clear text human readable format. When the ticket is presented to the validating system, the validating system automatically converts the encrypted validating information in machine readable format into a digital format, decrypts the encrypted validating information, tests the validating information to validate the ticket, and, if the ticket is valid, downloads at least a portion of the ticket information for reconciliation of accounts. That is, to reconcile ticket issuance, use, and payment.

In accordance with one aspect of the subject invention the machine readable format is a two dimensional barcode.

In accordance with another aspect of the subject invention, the data processing system accesses a database to determine service availability and provides service availability information to a purchaser and the purchaser inputs ticket request information in response to the service availability information.

In accordance with another aspect of the subject invention the data processing system stores an encryption key $E_m$ and the validating system stores a corresponding decryption key $D_m$ and the encrypted validating information is encrypted with the key $E_m$ and decrypted by the validating system with the key $D_m$ to check the validating information and validate the ticket.

In accordance with another aspect of the subject invention the data processing system is one of a number of data processing systems, where each of the data processing systems has a uniquely associated encryption key and the data processing system stores an associated encryption key $E_i$, and a corresponding decryption key $D_i$ encrypted with encryption key $E_m$. The encrypted validating information comprises information encrypted with the key $E_i$, and the encrypted decryption key; and the validating system decrypts the encrypted decryption key to obtain the decryption key $D_i$, decrypts the encrypted validating information with the key $D_i$ and checks the information to validate the ticket.

In accordance with still another aspect of the subject invention the encrypted validating information is further encrypted with an encryption key $E_s$ and the local printing system includes a corresponding key $D_s$ so that transmissions between the data processing system and the local printing system cannot be intercepted.

In accordance with yet another aspect of the subject information the encrypted validating information in machine readable format includes information to be downloaded by the validating system for reconciliation of accounts.

In accordance with still yet another aspect of the subject invention the local printing system includes a facsimile system and at least a portion of the ticket information is transmitted from the data processing system to the local printing system as a facsimile signal.

Thus it can be seen that the subject invention achieves the above object and advantageously overcomes the disadvantages of the prior art. Other objects and advantages of the subject invention will be apparent to those skilled in the art from consideration of the attached drawings and the detailed description set forth below.

BRIEF DESCRIPTION OF THE DRAWINGS

FIGS. 3–5 show various protocols for providing encrypted validating information to assure the validity of tickets issued in accordance with the subject invention.

DETAILED DESCRIPTION OF PREFERRED EMBODIMENTS OF THE INVENTION

Figure 1:
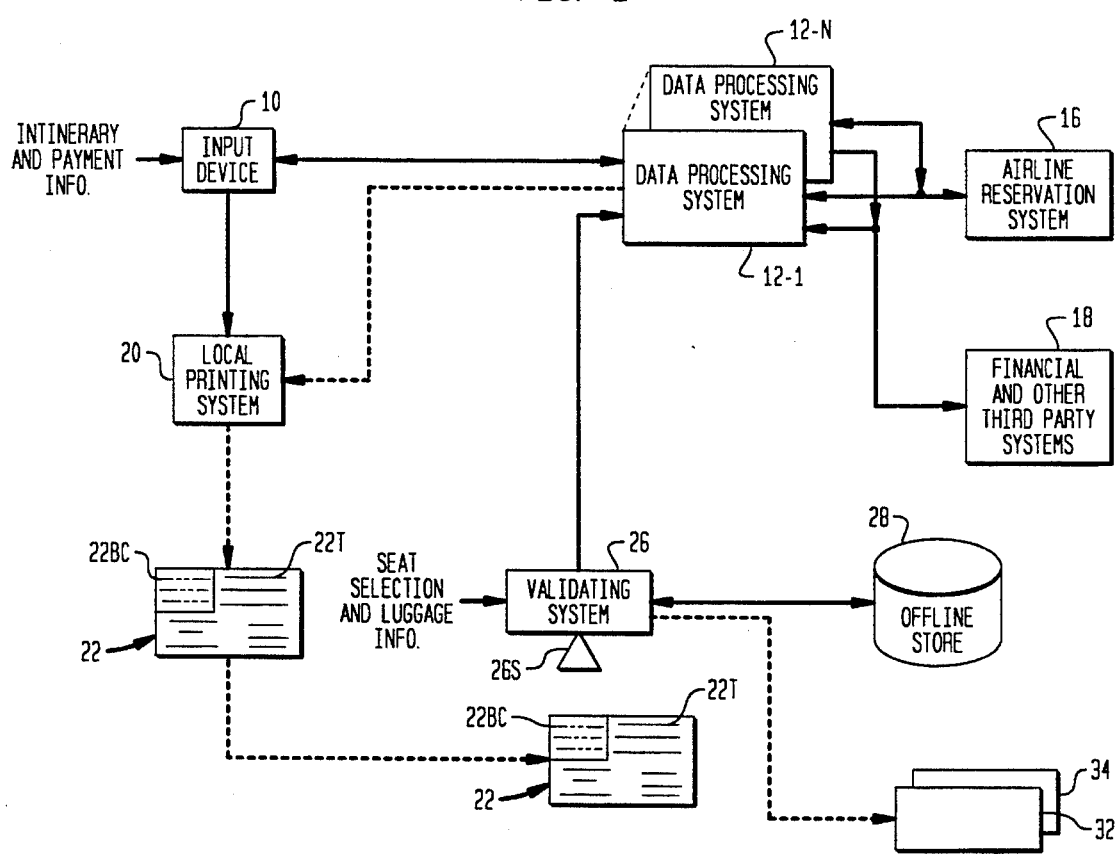
FIG. 1 shows a schematic block diagram of a system for automatically issuing and validating tickets in accordance with the subject invention.

FIG. 1 shows a schematic block diagram of a system for issuing airline tickets in accordance with the subject invention. While the preferred embodiment shown relates to airline tickets the applicability of such systems to other types of tickets, such as tickets to entertainment events, will be clearly apparent to those skilled in the art.

A purchaser, wishing to obtain an airline ticket, inputs information through input device 10, which may be a personal computer, or an non-intelligent terminal device, or any other suitable input device, to data processing system 12-1. In a preferred embodiment data processing system 12-1 will be one of a plurality of data processing systems located at convenient sites. Data processing system 12-1 communicates with an airline reservation system, such as the well known Sabre System of American Airlines, to obtain information as to the availability of suitable flights consistent with the purchaser's itinerary. In another embodiment of the subject invention data processing system 12-1 and reservation system 16 may be combined in a single system.

Data processing system 12-1 also communicates with financial and other third party systems to validate payment information and to allow a purchaser to make reservations for additional related services such as hotel reservations and rental car reservations.

Data processing system 12-1 returns ticket information, including encrypted validating information, to local printing system 20. In one embodiment of the invention, where input device 10, is a personal computer the ticket information is returned through input device 10 and local printing system 20 is an non-intelligent printer operating under the control of input device 10. In another embodiment of the invention local printing system 20 may be an non-intelligent system communicating directly with data processing system 12-1. In still another embodiment local printing system 20 is a facsimile printer.

In these embodiment local printing system 20 prints ticket 22 which includes conventional ticket information such as the purchaser's name, destination, flight, fare, etc. Ticket 22 also includes field 22BC Wherein the encrypted validating information is printed in a machine recognizable from, which is preferably a two dimensional barcode such as barcode in accordance with the known PDF417 standard developed by Symbol Technologies Inc. of Bohemia New York.

Preferably field 22BC includes information T which corresponds to at least a part of the conventional ticket information printed in field 22T, and preferably information T will include sufficient information to enable automatic reconciliation of ticket 22, as will be described further below. Information T may either be fully encrypted or, preferably, may be digitally signed. As is well known to those skilled in the arts information is digitally signed by extracting a portion of the information, such as a check sum, and encrypting the extracted information. The signed information is then validated by repeating the process and comparing the digital signatures. In an alternative embodiment of the invention field 22BC can contain only a signature of the conventional information in field 22T and information to reconcile ticket 22 can be recovered by optical character recognition (OCR) techniques or an operator, if desired.

To use ticket 22 the purchaser presents it at the airport where it is scanned by validating system 26, which includes a conventional two dimensional barcode scanner 26S. System 26 converts the two dimensional barcode in field 22BC into a digital format suitable for processing, decrypts it and tests information T to validate the ticket in any convenient manner as described above. (As used herein the term "decryption" includes validation a digital signature, as described above.)

In other embodiments of the subject invention the decrypted information T is validated by comparison to the conventional information in field 22T either by a system operator or by an OCR capability included in system 26.

Validating system 26 also includes a capability for a ticket purchaser to make or change seat selection, or to check luggage. Once the purchaser has input seat selection and luggage information, system 26 then prints boarding pass 32 and luggage check 34. (Those skilled in the art will recognize that where system 26 prints luggage checks it will be desirable to provide system 26 with an attendant or other mechanism for assuring that the purchaser actually checks a number of luggage pieces equal to the number of luggage checks requested.)

Validating system 26 then downloads information to reconcile ticket 22. Preferably such information is downloaded to off-line Store 28, but may be downloaded directly to data processing system 12-1. While it is preferred to include the information needed to reconcile ticket 22 in information T in other embodiments validating system 26 may included an OCR system to recover the information needed to reconcile ticket 22 from the conventional information in field 22T.

Figure 2:
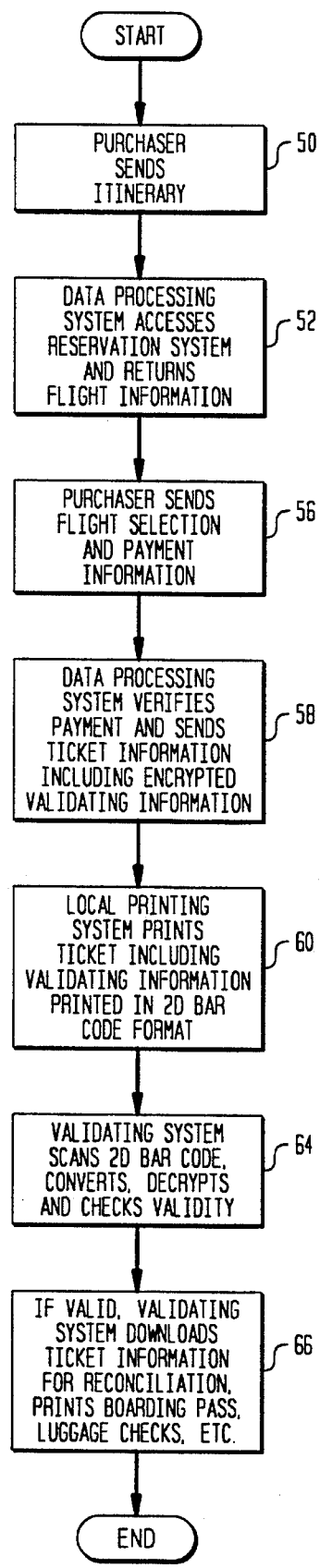
FIG. 2 shows a flow chart of the operation of the system of FIG. 1.

Turning to FIG. 2, a flow chart more fully describing the operation of the system of FIG. 1 is shown.

At 50 a purchaser sends a planned itinerary to data processing system 12-1. At 52 data processing system 12-1 accesses reservation system 16 and returns flight information identifying the available flights compatible with the submitted itinerary. At 56 the purchaser reviews the flight information and sends a flight selection and payment information to data processing system 12-1. Preferably the payment information is simply the purchaser's credit or debit card number but it is within the contemplation of the invention that any of the encryption payment schemes purposed or later developed for electronic payment may be used. At this point the purchaser may also request additional services such as hotel or rental car reservations.

At 58 data processing system 12-1 verifies payment and sends ticket information which includes conventional information normally found on an airline ticket in clear text, as well as encrypted validating information. As discussed above the encrypted validating information preferably will include enough of the conventional information to allow automated reconciliation of the ticket when the ticket is scanned. If the purchaser has requested additional services at this point data processing system 12-1 communicates the reservation request to the providers of such additional services. At 60 local printing system 20 receives the ticket information and prints ticket 22. Local printing system 20 will include conventional software for printing the encrypted validating information in two dimensional barcode format. Software for printing of two dimensional barcode such as PDF417 is well known and need not be discussed further here for an understanding of the invention.

In other embodiments of the subject invention, conversion to machine readable format is done at data processing system 12-1 and the ticket information is transmitted to printing system 20 as a facsimile signal for facsimile reproduction by print system 20.

At 64 the purchaser presents ticket 22 at validating system 26 which scans the 2D barcode, converts it to a digital format suitable for processing, decrypts information T, and checks validity as noted above, if information T is digitally signed then its validity is automatically confirmed if the signatures compare. If information T is fully encrypted any attempt and forgery will produce meaningless information whose validity can be tested by simple check sums or comparison of the information format. However, it is within the contemplation of the subject invention that the decrypted information T may be compared to the conventional information printed on the ticket in clear text either by an OCR capability or by an attendant.

If ticket 2 is validated, system 26 downloads the necessary ticket information for reconciliation and prints boarding passes luggage checks etc. as necessary.

Turning to FIG. 3, one protocol for the generation of encrypted validating information is shown. In the protocol of FIG. 3 data processing system 12-1 includes an encryption key $E_m$ with which it encrypts information T to form encrypted validating information $E_m[T]$ which is sent to local printing system 20. Local printing system 20 includes a conventional capability for printing two dimensional barcode and imprints ticket 22 with the encrypted validating information in two dimensional barcode format 2DBC $[E_m[T]]$. Validating system 26 includes a conventional capability for scanning two dimensional barcode and converting it to a digital format and decryption key $D_m$, corresponding to key $E_m$. System 26 scans and converts the encrypted validating information, to digital format decrypts it using key $D_m$ and checks information T to confirm the validity of the ticket. (As noted above, as used herein "decrypts" includes testing of digital signatures in a conventional manner.)

Preferably keys $E_m$ and $D_m$ are keys for a public key encryption system such as the well known RSA system where it is essentially impossible to obtain the encryption key from knowledge of encrypted messages and the decryption key. Thus, compromise of validating system 26 would not allow an unauthorized user to generate counterfeit tickets. However, for applications where adequate physical security of the elements of the system can be maintained, use of secret key systems, which have a single encryption/decryption key, are within the contemplation of the subject invention.

The system of FIG. 3 is believed adequate for systems with a single data processing system which may be maintained under sufficient security to avoid compromise of encryption key $E_m$. However, it is believed preferable in many applications to provide a plurality of data processing systems, as discussed above. In this case, in order to increase security and prevent the compromise of one data processing system from compromising the entire system, each data processing system is provided with a uniquely associated encryption key $E_i$ and an encrypted decryption key $E_m[D_i]$ and the encrypted validating information comprises information T encrypted with key $E_i$, $E_i[T]$ and the encrypted decryption key $E_m[D_i]$. Local printing system 20 operates as in FIG. 3 to print the encrypted validating information in two dimensional barcode format. Validating system 26 scans and converts the information in two dimensional barcode format, decrypts the encrypted decryption key to obtain key $D_i$, uses key $D_i$ to obtain information T, and checks information T to validate the ticket.

Turning to FIG. 5 a protocol is shown which protects against the possibility of third parties attempting to intercept messages to local printing system 20 and producing counterfeit duplicate tickets. Data processing system 12-1 stores a list of encryption key $E_s$ associated with various local printing systems which communicate with data processing system 12-1 and also store encryption key $E_i$ and encryption decryption key $E_m[D_i]$ as described above with regard to FIG. 4. Encrypted validating information is formed as described with respect to FIG. 4 and encrypted again with a particular one of keys $E_s$ corresponding to local printing system 20. Printing system 20 stores a corresponding decryption key $D_s$ to decrypt the doubly encrypted validating information and then prints the encrypted validating information in two dimensional barcode format as described above with respect to FIG. 4. Validating system 26, of course, also operates as shown in FIG. 4. By also encrypting the plain text information to be printed on ticket 22 a person intercepting the message would be unable to even print a counterfeit duplicate ticket.

Other protocols adopted to other applications are also within the contemplation of the subject invention.

The detailed descriptions of preferred embodiments described above and illustrated in the attached drawings have been given by way of illustration only, and numerous other embodiments of the subject invention will be apparent to those skilled in the art from consideration of the embodiments described. Accordingly limitations on the invention are to be found only in the claims set forth below.

What is claimed is:

1. A system for issuing tickets, comprising:
   a) a data processing system for:
      a1) receiving ticket request information; and,
      a2) generating ticket information; said ticket information including encrypted validating information;
   b) a local printing system for:
      b1) receiving said ticket information; and,
      b2) printing said encrypted validating information on a ticket in a machine readable format; and
   c) a validating system for:
      c1) automatically converting said encrypted validating information in machine readable format into a digital format;
      c2) decrypting said encrypted validating information.
      c3) locally testing said validating information with respect to information on said ticket to validate said ticket; and,
      c4) if said ticket is valid, downloading at least a portion of said ticket information for reconciliation of accounts.

2. A system as described in claim 1 wherein said ticket is an airline ticket.

3. A system as described in claim 1 wherein said machine readable format is a two dimensional barcode.

4. A system as described in claim 1 wherein said data processing system is further for receiving and confirming payment information, and said data processing system generating said ticket information only if said payment information is confirmed.

5. A system as described in claim 1 wherein said data processing system is further for accessing a database to determine service availability and provide service availability information to a purchaser, said purchaser inputting said ticket request information in response to said service availability information.

6. A system as described in claim 1 wherein said data processing system is further for communicating with third party systems to reserve additional services for a purchaser of said ticket.

7. A system as described in claim 1 wherein said data processing system stores an encryption key $E_m$ and said validating system stores a corresponding decryption key $D_m$, said encrypted validating information comprising information T encrypted with said key $E_m$, and said validating system decrypts said encrypted validating information with said decryption key $D_m$ to check said information T.

8. A system as described in claim 7 wherein said information T includes information to be downloaded for reconciliation.

9. A system as described in claim 1 wherein said data processing system is one of a plurality of data processing systems, each of said plurality of data processing systems having a uniquely associated encryption key, said data processing systems storing an associated encryption key $E_i$ and a corresponding decryption key $D_i$ encrypted with an encryption key $E_m$, and said validating system stores a corresponding decryption key $D_m$, said validating information comprising information T encrypted with said key $E_i$, and said encrypted decryption key, said validating system decrypting said encrypted decryption key with said decryption key $D_m$ to obtain said decryption key $D_i$ and decrypting said encrypted validating information with said key $D_i$ to check said information T.

10. A system as described in claim 9 wherein said information T includes information to be downloaded for reconciliation.

11. A system as described in claim 9 wherein said data processing system stores another encryption key $E_s$ and said validating information is encrypted with said encryption key $E_s$, and said local printing station stores a corresponding decryption key $D_s$ and decrypts said validating information prior to printing said ticket.

12. A system as described in claim 11 wherein said information T includes information to be downloaded for reconciliation.

13. A method for issuing tickets including the steps of:

a) receiving ticket request information from a purchaser;

b) generating ticket information, said ticket information including encrypted validating information;

c) transmitting said ticket information to a local printing system, said local printing system automatically printing a ticket for said purchaser, said ticket having said encrypted validating information printed thereon in a machine readable format;

d) providing a validating system at a location where said purchaser will present said ticket, said validating system, upon presentation of said ticket, automatically;

d1) converting said encrypted validating information in machine readable format into a digital format;

d2) decrypting said encrypted validating information;

d3) locally testing said validating information with respect to information on said ticket to validate said ticket; and, d4) if said ticket is valid, downloading at least a portion of said ticket information for reconciliation of accounts.

14. A method as described in claim 13 wherein said tickets are airline tickets.

15. A method as described in claim 13 wherein said machine readable format is a two-dimensional barcode.

16. A method as described in claim 13 comprising the further step of accessing a database to determine service availability and providing service availability information to a purchaser prior to generating ticket information.

17. A method as described in claim 13 wherein said encrypted validating information comprises information T encrypted with an encryption key $E_m$ and said validating system stores a corresponding decryption key $D_m$ and decrypts said encrypted validating information to check said information T.

18. A method as described in claim 17 wherein said information T includes information to be downloaded for reconciliation.

19. A method as described in claim 13 wherein said encrypted validating information comprises information T encrypted with an encryption key $E_i$ associated with the source of said ticket and a corresponding decryption key $D_i$ encrypted with another encryption key $E_m$, said validating system storing a decryption key $D_m$ to decrypt said encrypted decryption key to obtain said key $D_i$ and decrypting said encrypted validating information to check said information T.

20. A method as described in claim 19 wherein said information T includes information to be downloaded for reconciliation.

21. A system as described in claim 1 wherein said local printing system includes a facsimile system and at least a portion of said ticket information is generated as a facsimile signal.

* * * * *